United States Patent
Sardesai et al.

(10) Patent No.: US 12,452,031 B2
(45) Date of Patent: *Oct. 21, 2025

(54) HOMOMORPHIC ENCRYPTION OFFLOAD FOR LIGHTWEIGHT DEVICES

(71) Applicant: VERIZON PATENT AND LICENSING INC., Basking Ridge, NJ (US)

(72) Inventors: Ashish Sardesai, Ashburn, VA (US); Paritosh Tyagi, Boyds, MD (US); Venkata Josyula, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/158,657

(22) Filed: Jan. 24, 2023

(65) Prior Publication Data

US 2023/0163946 A1    May 25, 2023

Related U.S. Application Data

(63) Continuation of application No. 17/109,795, filed on Dec. 2, 2020, now Pat. No. 11,582,020.

(51) Int. Cl.
*H04L 9/00* (2022.01)
*G06F 21/60* (2013.01)
*H04L 9/08* (2006.01)
*H04L 9/40* (2022.01)

(52) U.S. Cl.
CPC ............ *H04L 9/008* (2013.01); *G06F 21/602* (2013.01); *H04L 9/0819* (2013.01); *H04L 63/0428* (2013.01); *H04L 9/0894* (2013.01)

(58) Field of Classification Search
CPC ... H04L 9/008; H04L 9/0819; H04L 63/0428; H04L 9/0894; G06F 21/602
See application file for complete search history.

(56) References Cited

U.S. PATENT DOCUMENTS

| | | | |
|---|---|---|---|
| 2013/0086390 A1 | 4/2013 | Kennedy et al. | |
| 2013/0329883 A1* | 12/2013 | Tamayo-Rios | H04L 9/008 380/28 |
| 2018/0191692 A1 | 7/2018 | Frank | |
| 2018/0260576 A1* | 9/2018 | Miguel | H04L 9/008 |
| 2019/0007756 A1* | 1/2019 | Navali | H04L 63/0428 |
| 2019/0332814 A1 | 10/2019 | Bos et al. | |
| 2019/0394019 A1* | 12/2019 | Gao | H04L 9/008 |

(Continued)

*Primary Examiner* — Benjamin E Lanier

(57) ABSTRACT

Disclosed are systems, methods, devices, and computer-readable media for offloading lattice-based cryptographic operations to hybrid cloud computing system. In one embodiment, a method is disclosed comprising receiving a first network request from a client device via a secure application programming interface (API), the request including unencrypted data; encrypting the unencrypted data using an algorithm that generates homomorphically encrypted data; issuing a second network request to a second API of a cloud platform, the second network request including the encrypted data; receiving a response from the cloud platform in response to the second network request; and transmitting, in response to the first network request, a result to the client device based on the response, the result obtained by decrypting an encrypted output returned by the cloud platform.

20 Claims, 8 Drawing Sheets

(56) References Cited

U.S. PATENT DOCUMENTS

2020/0134207 A1\* 4/2020 Doshi ................ G06F 16/1865
2020/0145384 A1   5/2020 Chauhan
2020/0244435 A1   7/2020 Shpurov et al.
2020/0327250 A1  10/2020 Wang et al.

\* cited by examiner

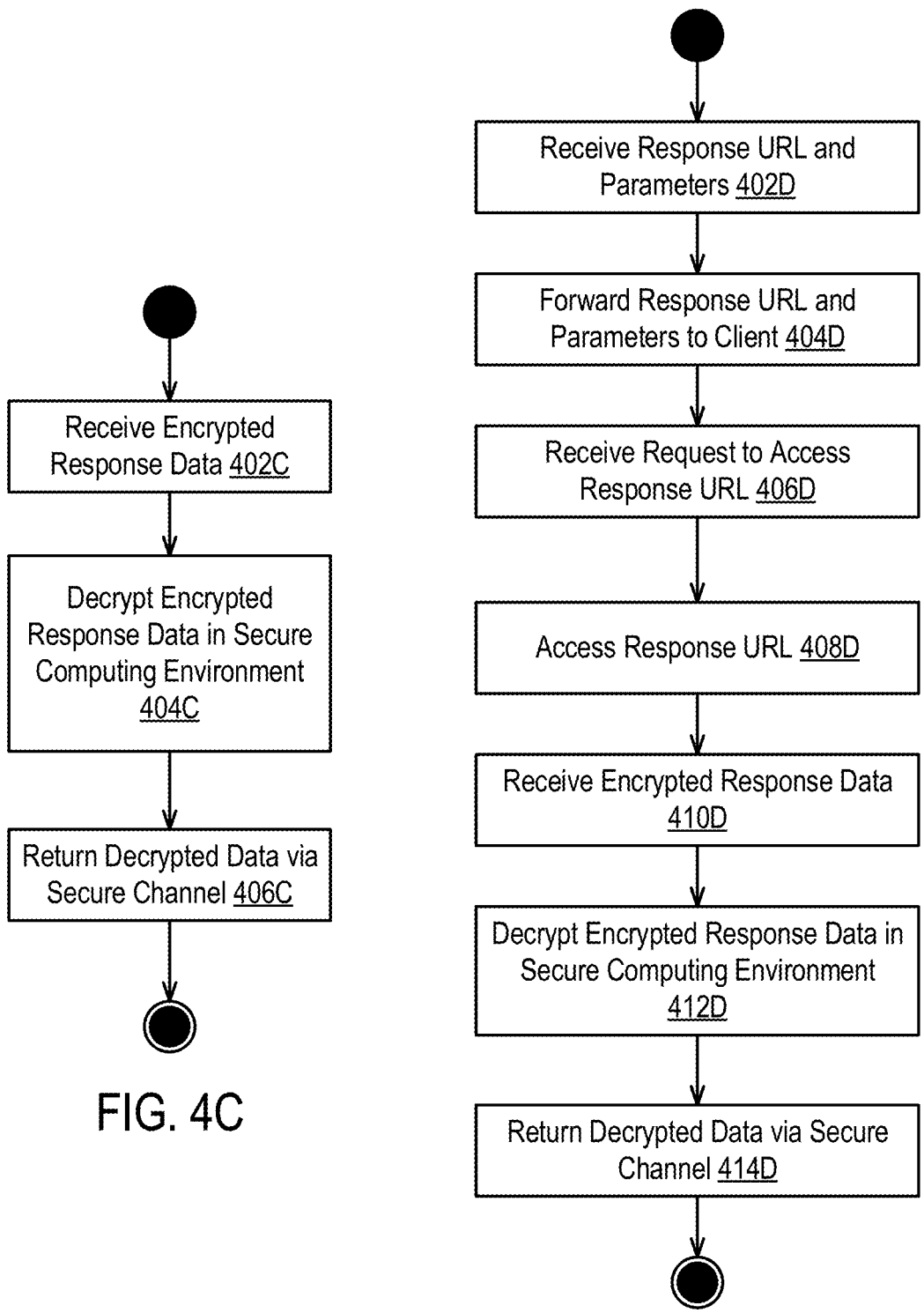

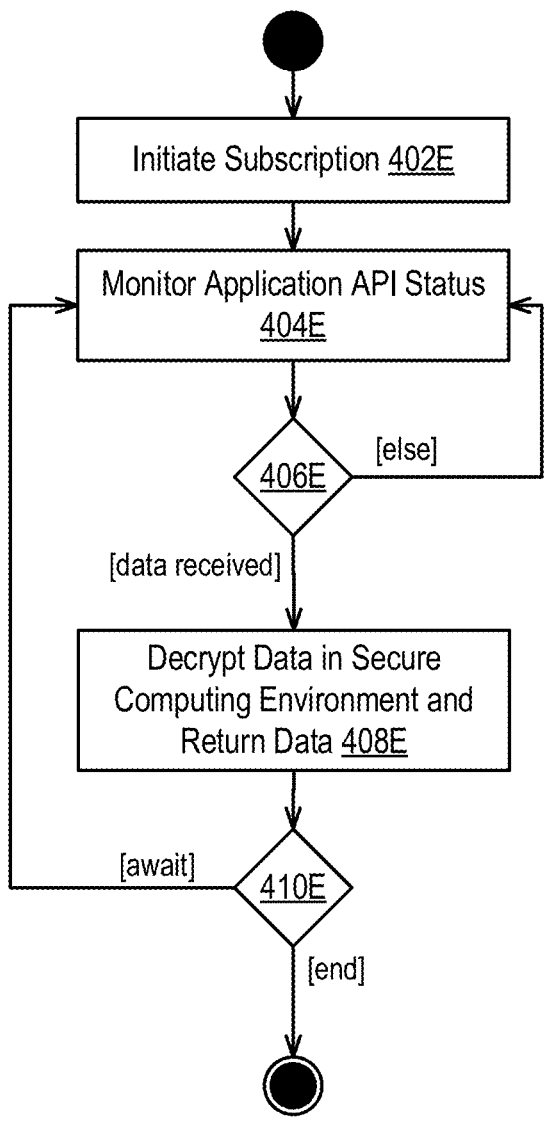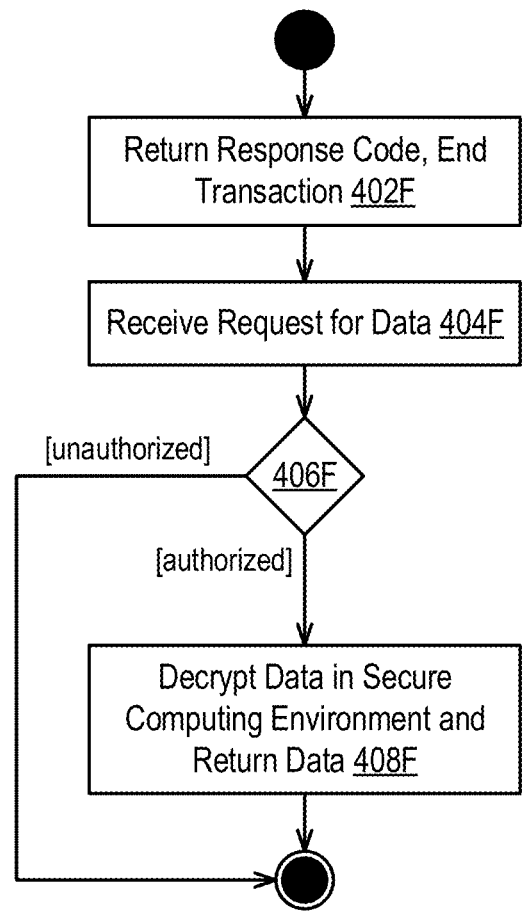
FIG. 4E
FIG. 4F

HOMOMORPHIC ENCRYPTION OFFLOAD FOR LIGHTWEIGHT DEVICES

CROSS-REFERENCE TO RELATED APPLICATIONS

This application is a continuation of and claims the benefit of. U.S. application Ser. No. 17/109,795, filed Dec. 2, 2020, which is incorporated by reference herein in its entirety.

BACKGROUND INFORMATION

The disclosed embodiments are related to cryptography and, specifically, to the use of lattice-based cryptography, such as homomorphic encryption by lightweight computing devices.

In network applications, encryption is generally used to secure sensitive data such as personally identifiable information (PII), financial data, medical data, and many other data types. In the overall data lifecycle, while encryption protects data during transit and storage, applications often operate on unencrypted data or the data is decrypted prior to processing.

Recently, a new class of encryption algorithms has been proposed, referred to as homomorphic encryption (HE) algorithms, whereby computational operations can be performed directly on the encrypted data without decrypting the data. However, these algorithms generally require significant computing power and storage capacity to perform even basic encrypted data operations and include storing large ciphertext data. Thus, most devices are not capable of supporting these algorithms natively or at scale.

Therefore, while data may be secured using traditional encryption methods during transmission in existing systems, the data is still insecure during processing and may be subject to data leaks or attacks. Further, HE adoption in lightweight devices has been impeded due to the complexity or resource constraints of implementing these algorithms on such devices.

BRIEF DESCRIPTION OF THE DRAWINGS

FIGS. 4C through 4F are flow diagrams illustrating methods processing the results of a distributed homomorphic operation according to some embodiments of the disclosure.

DETAILED DESCRIPTION OF EXAMPLE EMBODIMENTS

Figure 1:
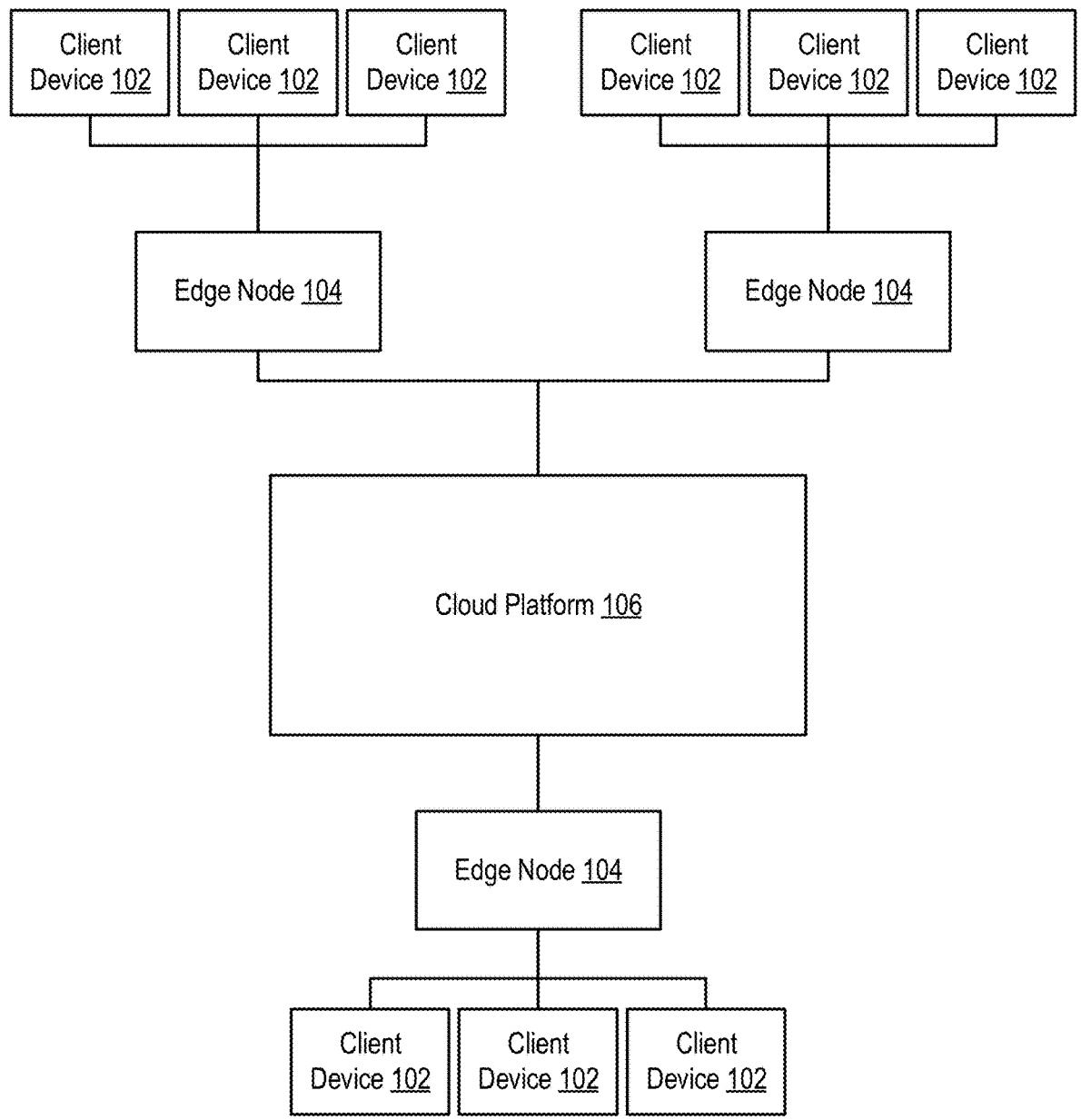
FIG. 1 is a block diagram of a network architecture for securing data using homomorphic encryption according to some embodiments of the disclosure.

The disclosed embodiments solve the problems mentioned above and others, for example issues arising because lightweight computing devices cannot implement HE algorithms due to low processing power or reduced persistent storage or memory capacity. Examples of lightweight computing devices include Internet-of-Things (IoT) devices, mobile phones, embedded processors, and similar devices. Such computing devices lack the available computing power to perform HE operations and have limited memory capacity to process the ciphertext data (i.e., encrypted data) generated by HE algorithms.

The disclosed embodiments describe computing devices, network architectures, computer-readable media, and methods that offload HE operations from lightweight devices to either far cloud devices or edge cloud devices based on application use cases being exercised from the lightweight devices. As used herein, HE algorithms refer to partially, somewhat, leveled fully, or fully HE algorithms. Although HE algorithms are described herein, the disclosure applies equally to other lattice-based cryptographic algorithms.

The users of these lightweight devices can still leverage the privacy-preserving properties of HE without having to bear the penalties associated with computational complexity and bandwidth utilization. Additionally, the requirement to install the new HE software on the devices is eliminated while still allowing the devices to leverage the privacy functions offered by HE via the cloud. The disclosed embodiments enable such lightweight devices to take advantage of cryptographic agility via a cloud platform and incorporate ongoing advancements in algorithms and related software without the burden of implementing such algorithms and software directly on the devices.

In brief, the disclosed embodiments describe applications on client devices that establish keys to be stored in one or more remote computing devices (e.g., edge node or cloud computing platform). The client devices may generate these keys locally or request that the remote computing device(s) generate the keys. In either scenario, the remote computing devices store the keys in a secure computing environment. The client devices then issue requests to access a cloud platform. In one embodiment, these requests are made through the edge nodes, although in other embodiments the requests can be issued directly to the cloud platform. The edge nodes intercept these requests and encrypt any application data using an HE algorithm and the stored keys. The encryption is also performed in the secure computing environment. The edge node forwards the request, with encrypted rather than raw application data, to the cloud platform. The cloud platform performs HE operations on the encrypted data and returns a response. The edge node processes the response and returns a result to the client device. Ultimately, the edge node will decrypt the encrypted response from the cloud platform and return the decrypted data to the client device.

In addition to the use of the disclosed embodiments in lightweight devices, the disclosed embodiments may also be utilized by legacy applications wherein the legacy applications cannot be easily updated to or integrated with new HE software. Integration options could be offered to legacy applications to leverage the privacy-preserving function of HE algorithms.

The foregoing embodiments and embodiments described herein describe the use of edge nodes in managing keys and performing cryptographic operations. However, in some embodiments, the functionality of the edge nodes may be included in the cloud platform itself. In such embodiments, the cloud platform thus performs all the functions of the edge nodes described herein. Any description of processing performed by edge nodes is equally applicable to the cloud platform.

FIG. 1 is a block diagram of a network architecture for securing data using homomorphic encryption according to some embodiments of the disclosure.

In the illustrated embodiment, client devices (102) communicate with a cloud platform (106) via one or more edge nodes (104). In the illustrated embodiment, the edge nodes (104) are collectively referred to as the "Edge Cloud," and the cloud platform (106) is referred to as the "Far Cloud."

The client devices (102) may comprise lightweight computing devices such as mobile devices, IoT devices, embedded computing devices, etc. In some embodiments, even computing devices capable of supporting HE operations may comprise the client devices (102). In general, each of the client devices (102) may comprise any device that is not capable of performing HE operations on data. This lack of capability may be physical; i.e., the device does not include the necessary processing power or persistent storage/memory capacity to execute the HE operations successfully. Alternatively, or in conjunction with the preceding, the lack of capability may be required due to allocating resources for other processes or hardware. Thus, in some embodiments, the client devices (102) may technically be capable of performing HE operations but may still offload HE operations to Edge Cloud and Far Cloud, as described herein.

In the illustrated embodiment, the client devices (102) execute applications requiring secure data and, in most embodiments, secure operations on such data. For example, an IoT sensor may record a patient's vital health data and upload the recorded data to a centralized logging system. In this example, the data recorded by the client devices (102) should be encrypted or otherwise obfuscated when leaving the client devices (102) to comply with relevant health data privacy regulations. As a second example, a mobile phone may continuously record a user's position and upload this position data to a server for downstream processing by other entities (e.g., for targeting location-specific content). In this second example, obfuscating a user's location is preferred to improve the users' privacy, and such obfuscation may be required by law in some jurisdictions. A client device may wish to upload sensitive data to a remote application in a third and generalized example and instruct the remote application to perform one or more operations on the sensitive data. In this third example, the client device proactively requests that data be secured during transport and processing. In each of these examples, the data generated by the client device should not be decrypted for processing by an external computing device since decrypting the data will result in the cleartext data being present on a remote computing system (e.g., cloud platform 106) that may be untrusted.

In the illustrated embodiment, an edge cloud operates to process some (or all) network traffic to and from the client device (102). The edge cloud comprises a plurality of edge nodes (104). An edge node (104) may comprise a computing device such as that depicted in FIG. 6.

In some embodiments, an edge node (104) may comprise a mobile edge compute (MEC) node. In these embodiments, an edge node (104) may comprise a computing device or collection of computing devices that provide a cloud computing system to the client devices (102). In general, the computing devices may comprise server computing devices that comprise any computing device capable of responding to network requests from another computing device (referred to generally as a client) and is not intended to be limited to a specific hardware or software configuration a device.

In some embodiments, the edge nodes (104) may be implemented at the edge of a cellular network. The edge nodes (104) may be situated in a cellular base station or equivalent location. In this embodiment, the edge node (104) may comprise an application server installed within a cellular base station. In some embodiments, the application server is installed in an Evolved Node B or Node B of a 5G or 4G cellular network, respectively.

In some embodiments, an edge node (104) may comprise a physical computing device (e.g., physical server). In other embodiments, an edge node (104) may comprise a virtualized computing platform (e.g., virtual server, container, etc.).

In the illustrated embodiment, multiple edge nodes (104) may be distributed across the network. As described above, each edge node (104) may be situated in or near a cellular base station in one embodiment. In this embodiment, the client devices (102) communicatively coupled to a respective edge node (104) may comprise devices within a cellular coverage area provided by the respective base station. In another embodiment, each edge node (104) may be situated in an internet service provider (ISP) location. In other embodiments, the edge nodes (104) may be situated in other geographically dispersed locations such as wireless access point (WAP) devices.

In the illustrated embodiments, an edge node (104) includes a secure computing environment in addition to other, non-secure computing environments. As used herein, a secure computing environment refers to a secure processing element that is physically or logically separate from an insecure processing element and can store and process secure data without external access by an insecure processing element. Examples of a secure computing environment include a Secure Enclave (SE), a hardware security module (HSM), and a trusted execution environment (TEE).

In the illustrated embodiment, an edge node (104) exposes a public application programming interface (API) for performing various functions described herein. As used herein, a public API refers to an API accessible by client devices (102), even if authentication is required. In the illustrated embodiment, an API provided by each edge node (104) provides key management functionality, cryptographic functionality (also referred to as offload API functionality), and application functionality. In one embodiment, key management functionality comprises the generation and storing of secret keys on behalf of client devices (102). Details of key management functions are provided in the descriptions of FIGS. 3A through 3D, which are not repeated herein. In one embodiment, cryptographic functionality comprises the encryption and decryption of data using HE algorithms and the stored cryptographic keys. Details of the cryptographic functions are provided in the descriptions of FIGS. 4A and 4B, which are not repeated herein. In one embodiment, application functionality comprises forwarding application requests to the cloud platform (106), including encrypted application data in the requests, and handling data returned from the cloud platform (106). Details of application functions are provided in the descriptions of FIGS. 4C through 4F, which are not repeated herein.

In some embodiments, the edge nodes (104) form part of a cellular network (not illustrated). Thus, in some embodiments, the edge nodes (104) are further connected to various devices of the core network of a cellular network. Details of the operation of a cellular network, especially the packet core of a cellular network, are not described in detail. For example, the pathway between an edge node (104) and the cloud platform (106) may necessarily include data transmitted between various components of a core packet network such as a mobility management entity (MME), package data network gate (PGW), and serving gateway (SGW) in a 5G cellular network. Details of these are not provided, and any cellular packet core network may be utilized.

In the illustrated embodiment, the edge nodes (104) are communicatively coupled to the cloud platform (106). In the illustrated embodiment, the cloud platform (106) may comprise a software-as-a-service (SaaS) platform or other multi-tenanted application running over a network. In general, the cloud platform (106) may comprise a single computing device or multiple computing devices providing a network service. As illustrated, the cloud platform (106) may present a unified, single logical view of the application regardless of the underlying physical infrastructure. Thus, the cloud platform (106) may comprise a plurality of geographically dispersed data centers, yet provide a homogenous network interface.

In the illustrated embodiment, the cloud platform (106) provides an API (referred to as the Application API) for accessing functionality offered by the cloud platform (106). The edge nodes (104) are thus capable of calling methods or operations defined by the cloud platform (106) API and transmit data to fulfill those requests. In the illustrated embodiment, the data included in the API calls comprises homomorphically encrypted application data, the encryption being performed by the edge nodes (104). The operations provided by the cloud platform (106) may be designed to operate on such encrypted data and thus may include HE algorithms (also referred to as HE operations). Details of the internal operation of the cloud platform (106) are described in more detail in the description of FIG. 5. In some embodiments, the cloud platform (106) may process the encrypted data using an HE algorithm and return the encrypted result edge node (104) that requested the operation. Details of this embodiment are described in more detail in FIG. 4C. In alternative embodiments, the cloud platform (106) may utilize various other techniques to return data to the edge nodes (104) or client devices (102). These alternative embodiments are described in more detail in FIGS. 4D through 4F.

In some embodiments, the edge nodes (104) and the cloud platform (106) may exchange data outside the context of processing requests from client devices (102). For example, the edge nodes (104) may synchronize data with a centralized data store maintained by the cloud platform (106). This may be incorporated when the edge nodes (104) form an Edge Cloud and require synchronization with data from other edge nodes (104). In other embodiments, the edge nodes (104) may synchronize with one another. In some embodiments, the edge nodes (104) may transmit unencrypted data to the cloud platform (106) as well (albeit over an encrypted channel or tunnel). For example, a client device (102) may present authentication details (e.g., username/password, secure token, etc.) to the edge nodes (104), which, in turn, forwards this request to the cloud platform (106), which authenticates the user and returns an authentication result to the edge nodes (104). In some embodiments, the edge nodes (104) may synchronize data via a cellular core network and thus may not leave the cellular network's boundaries.

The preceding description of client devices (102), edge nodes (104), and cloud platform (106) describe the system-level interactions of said components. Each component (102, 104, 106) includes various sub-components not described in detail in the description of FIG. 1 but described in more detail in the following FIG. 2.

Figure 2:
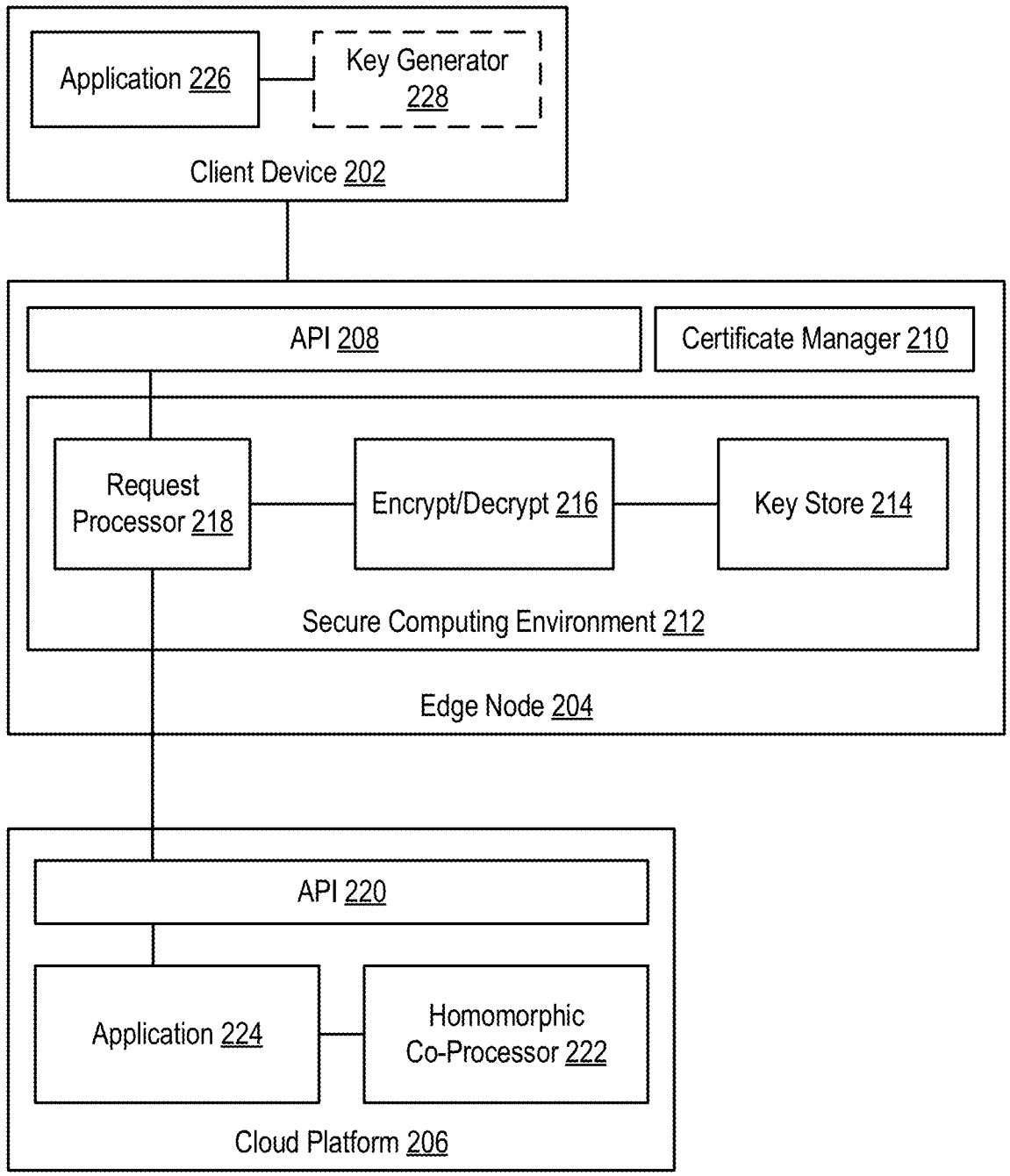
FIG. 2 is a block diagram of a system for securing data using homomorphic encryption according to some embodiments of the disclosure.

FIG. 2 is a block diagram of a system for securing data using homomorphic encryption according to some embodiments of the disclosure.

In the illustrated embodiment, the system includes a client device (202), edge node (204), and cloud platform (206). The client device (202), edge node (204), and cloud platform (206) correspond to a selected client device (102), selected edge node (104), and the cloud platform (106) described in FIG. 1 and those descriptions are not repeated herein but apply equally to the client device (202), edge node (204), and cloud platform (206).

The client device (202) includes an application (226) and an optional key generator (228). In the illustrated embodiment, the application (226) comprises a software application capable of issuing network requests to the edge node (204) and other network computing devices. The specific type and functionality provided by the application (226) are not limiting, and generally, the client device (202) may implement any application. Examples of applications include monitoring applications of an IoT device, healthcare applications embedded in hospital electronics, activity applications in wearable devices, betting and auction applications, mobile applications on mobile devices, etc. In some embodiments, the application (226) may also include dedicated hardware or be implemented entirely in hardware. In some embodiments, the application (226) may be implemented in lower-level firmware or machine code.

As illustrated, in some embodiments, the client device (202) includes a key generator (228). In the illustrated embodiment, a key generator (228) comprises a cryptographic algorithm that can generate a secret key for use with an encryption algorithm, such as an HE algorithm. The specific algorithm implemented by the key generator (228) may depend on the HE algorithm used and is thus not limiting. In general, however, the key generator (228) may generate a fixed-length value that is randomly or pseudo-randomly generated based on a supplied context. The supplied context may include a plurality of parameters used to seed the key generation algorithm. In one embodiment, the key generator (228) may generate a single key. In this embodiment, the single key comprises a symmetric key. In other embodiments, the key generator (228) may generate multiple keys. In these embodiments, the key generator (228) may generate a public and private key and thus may comprise an asymmetric key pair.

In some embodiments, the key generator (228) is optional in the client device (202). In these embodiments, the functionality of the key generator (228) may be located in the edge node (204). Further, in these embodiments, the functionality may be identical to that described above with respect to the key generator (228).

As illustrated, the client device (202) interacts with an edge node (204). As described in FIG. 1, the edge node (204) performs cryptographic processing of requests described in more detail below.

In the illustrated embodiment, the edge node (204) includes a public API (208). In one embodiment, this API (208) may comprise a Hypertext Transport Protocol (HTTP) API or a secure HTTP (HTTPS) API. All embodiments and examples referring to HTTP may alternatively use HTTPS (or similar application layer protocols), and vice-versa, and the disclosed embodiments are not limited to HTTP. In one embodiment, the API (208) comprises a representational state transfer (REST) API. In some embodiments, the API (208) exposes a plurality of endpoints callable by the client device (202). An endpoint may comprise an identified network address that can respond to network requests issued by a client device such as client device (202). In some embodiments, the API (208) defines an endpoint for each function capable of being executed by the edge node (204) in response to a client device (202). For example, in a REST API, an endpoint having a uniform resource locator (URL) of "https://edgenode/keys" and an HTTPS method of "POST" may map to a key storage operation. This operation may write a secure key to a secure storage location and return a status code (e.g., HTTP 201: Created) in response. The specific examples of endpoints are exemplary only, and other techniques may be used to expose API functionality.

In some embodiments, the API (208) may be implemented in the secure computing environment (212). However, as illustrated, in other embodiments, the API (208) is not required to be secure and may be implemented outside the secure computing environment (212). Specifically, the API (208) may comprise a lightweight API that primarily performs data validation of requests and is not required to be as secured as algorithms touching keys and encryption need. Alternatively, or in conjunction with the preceding, the API (208) may perform standard authentication and authorization routines to verify API calls' integrity and may be outside of the secure processing flow.

In the illustrated embodiment, the edge node (204) further includes a certificate manager (210). In one embodiment, the certificate manager (210) stores a plurality of certificate used to authenticate the edge node (204) as well as confirm the identity of one or more client devices such as client device (202). In one embodiment, the certificate manager (210) stores Transport Layer Security (TLS) or Secure Socket Layer (SSL) certificates. In general, TLS and SSL comprise protocols for establishing an encrypted session between two computing devices over a network. In TLS/SSL, digital certificates are used to verify the authenticity of a computing device while transport encryption secures data in-flight. Digital certificates, also known as identity certificates or public key certificates, are digital files that are used to certify the ownership of a public key. TLS certificates are a type of digital certificate issued by a Certificate Authority (CA). The CA signs the certificate, certifying that they have verified that it belongs to the owners of the domain name, which is the subject of the certificate. A TLS certificate may include the subject domain name, the subject organization, the name of the issuing CA, additional or alternative subject domain names, including subdomains (if any), an issue date, an expiry date, a public key, and the digital signature by the CA. In some embodiments, the edge node (204) acts as its own CA, self-signing the digital certificate. In this embodiment, the certificate manager (210) also generates digital certificates as well as stores them. In other embodiments, a third-party CA may be used to generate the certificate. In these embodiments, the certificate manager (210) may only store digital certificates.

When a client device (202) to connect to the edge node (204), the edge node (204) sends its digital certificate to the client device (202). The client device (202) then verifies the digital certificate of the edge node (204) using CA certificates that are present on the user's device to establish a secure connection. This verification process uses public-key cryptography, such as Rivest—Shamir—Adleman (RSA) or elliptical curve cryptography (ECC), to prove the CA signed the certificate. In the illustrated embodiment, the certificate manager (210) and API (208) communicate with the client device (202) to establish a secure communications tunnel (e.g., a secure HTTP, HTTPS, connection). Details of this process are described more fully in FIGS. 3A and 3B.

The API (208) generates and transmits commands to the secure computing environment (212). In the illustrated embodiment, the API (208) generates commands in response to the calling of endpoints defined by the API (208). In one embodiment, the API (208) generates and transmits commands to a request processor (218) implemented in the secure computing environment. In one embodiment, the request processor (218) may be configured to receive commands to update, store, or remove keys from the key store (214). In this embodiment, the request processor (218) may read and write keys to the key store (214). Further, if the edge node (204) implements a key generator (228), the key generator (228) may be implemented in the secure computing environment (212) and may receive requests to generate keys from the request processor (218). The key generator (228) may then write generated keys directly to the key store (214).

The secure computing environment (212) additionally includes an encryption/decryption module (216). In the illustrated embodiment, the encryption/decryption module (216) accesses keys from the key store (214) to perform encryption and decryption on application data sent by the client device (202). In one embodiment, the request processor (218) forwards the application data to the encryption/decryption module (216), and the encryption/decryption module (216) retrieves the appropriate key from the key store (214). The encryption/decryption module (216) then encrypts the data using the key. Conversely, the request processor (218) may receive encrypted data from the cloud platform (206). The request processor (218) may then forward the encrypted data to the encryption/decryption module (216). The encryption/decryption module (216) then retrieves the relevant keys from the key store (214) and decrypts the data. The encryption/decryption module (216) then transmits the decrypted data to the request processor (218).

In some embodiments, the request processor (218) may be implemented outside of the secure computing environment (212). In these embodiments, the secure computing environment (212) exposes a limited API for implementing the above functionality. The request processor (218) uses this API to perform secure operations that require the homomorphic keys.

In addition to managing key-related operations, the request processor (218) additionally processes application operations. An application operation refers to an operation to be performed by the cloud platform (206). For example, the client device (202) may issue a request for an operation to be performed by the cloud platform (206) to the edge node (204). The API (208) routes this request to the request processor (218), which extracts application data from the request, encrypts the data using the encryption/decryption module (216) as discussed above, and then re-packages the request and transmits the re-packaged request to the cloud platform (206). Notably, as part of this re-packaging, the request transmitted to the cloud platform (206) does not include the cleartext application data but rather the encrypted data. As described previously, the encryption/decryption module (216) may implement an HE algorithm.

In the illustrated embodiment, the cloud platform (206) receives requests issued by the edge node (204) and, in the illustrated embodiment, from the request processor (218). In the illustrated embodiment, the API (220) may comprise a similar API (220) (referred to as an Application API) to that of API (208) (i.e., an HTTPS REST API), and that discussion is not repeated herein. In general, the API (220) exposes a plurality of endpoints mapped to functions performed by an application (224) and homomorphic co-processor (222).

In the illustrated embodiment, the application (224) may comprise any executable application running on a cloud platform, and no limitation is placed on the specific operations performed. However, in the illustrated embodiment, the cloud platform (206) includes a homomorphic co-processor (222) that performs HE operations on encrypted data. In the illustrated embodiment, the cloud platform (206) separates the logic that requires HE operations from operations that do not. Thus, the homomorphic co-processor (222) may operate in parallel to other operations. As a concrete example, the cloud platform (206) may comprise a cloud logging service. In this instance, the application (224) may perform account lookups and other "housekeeping" operations while offloading HE operations to the homomorphic co-processor (222). Further, HE operations may be performed by the homomorphic co-processor (222) in parallel to, for example, accessing an account database, thus improving the speed of the cloud platform (206). Thus, in some embodiments, the cloud platform (206) can simulate non-HE performance by offloading HE tasks to the homomorphic co-processor (222) and returning an endpoint to call in the future for the results of the HE processing, as described in more detail in FIG. 4D.

In the illustrated embodiment, the API (220) can return results to the request processor (218). In one embodiment, described in FIG. 4C, the results include encrypted data processed by the homomorphic co-processor (222). The request processor (218) can decrypt this return data via the encryption/decryption module (216) as described previously and return the decrypted data to the client device (202). Thus, from the perspective of the client device (202), it appears that the initial request issued to the edge node (204) with unencrypted data was processed without any encryption. However, due to the interception and operations of edge node (204), the data is encrypted before leaving the edge node (204) and thus secured during processing by the cloud platform (206).

In the illustrated embodiment, homomorphic co-processor (222) is implemented separately from the application (224). This separation allows for implementing HE operations in legacy application since the HE operations can be isolated from the rest of the legacy code and can be "swapped" in for existing non-HE operations. In some embodiments, though, the homomorphic co-processor (222) may be implemented along with the application (224) as a single HE application. Such an implementation may be used for non-legacy applications or applications generally designed with HE in mind.

As described in FIG. 1, the cloud platform (206) may be communicatively coupled to other edge nodes not depicted in FIG. 2. In this embodiment, the application (224) may be configured to receive homomorphically encrypted data from multiple edge nodes. The application (224) may further be configured to process this HE data from multiple sources in one operation or transaction performed by the homomorphic co-processor (222). Thus, in this scenario, encrypted data from multiple sources may be received, left encrypted, and still processed by homomorphic co-processor (222).

Finally, it should be noted that FIGS. 1 and 2 depict separate edge nodes (104) and a cloud platform (106). In some embodiments, however, the functionality of these two components may be merged. That is, in some embodiments, all functionality performed by the cloud platform (106) may be performed by the edge nodes (104). In this embodiment, key management and encrypt/decrypt operations may still be present in a secure computing environment of the edge node (104), but the homomorphic application logic described as being performed by the cloud platform may not necessarily be required in a secure computing environment since such application logic does not have access to decrypted data or require decryption. Thus, internally, a non-secure portion of an edge node (104) may operate identically to the cloud platform (106) when the edge node (104) implements both the secure functionality and homomorphic processing operations. As described above, in yet other embodiments, the functionality of edge nodes (104) may be included in the cloud platform (106). Thus, the cloud platform (106) may include a secure computing environment to perform such functions described as being performed by an edge node (104).

The following FIGS. 3A through 3D, 4A through 4F, and 5 illustrate further detail regarding the methods performed by the client devices (102, 202), edge nodes (104, 204), and cloud platform (106, 206).

FIGS. 3A through 3D are flow diagrams illustrating methods for establishing HE keys according to some embodiments of the disclosure. In some embodiments, the methods described in FIGS. 3A and 3B may be performed by a client device while the methods of FIGS. 3C and 3D may be performed by an edge node.

Figure 3A:
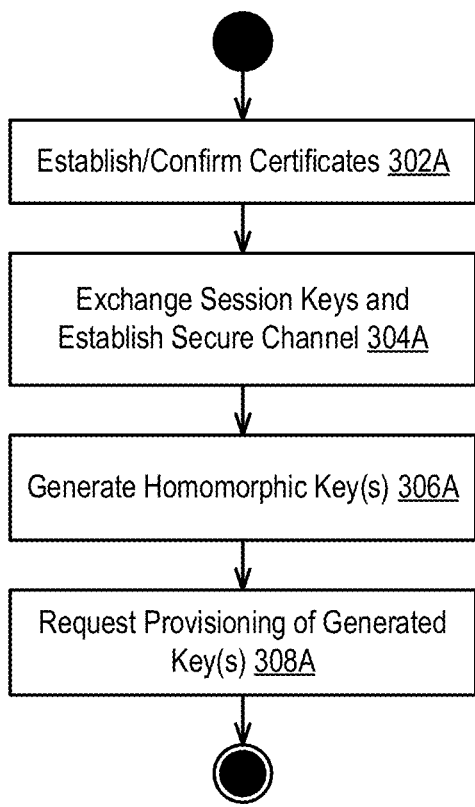
FIGS. 3A through 3D are flow diagrams illustrating methods for establishing homomorphic encryption keys according to some embodiments of the disclosure.

FIG. 3A illustrates a first embodiment executed by a client device to establish one or more homomorphic keys.

In step 302a, the method includes establishing and confirming digital certificates before establishing a secure channel. In one embodiment, the secure channel comprises a TLS/SSL channel. In one embodiment, a client device transmits an initiation message to an edge node (e.g., a TLS HELLO message) that identifies available cryptographic operations (e.g., cipher suites). In response, the edge node returns a selected cipher suite (i.e., one supported by the edge node as well) and a digital certificate. In one embodiment, the digital certificate of the edge node may be a self-signed certificate. In other embodiments, the digital certificate may comprise a certificate signed by a CA.

The client device confirms the digital certificate is valid. In one embodiment, the client device first checks to ensure that the edge node's certificate is not expired and that the domain name or Internet Protocol (IP) address on the certificate matches the edge node's IP address. Then, the client device attempts to verify that the edge node's certificate has been properly signed by the CA, who authorized it. In some embodiments, the digital certificate may be self-signed. In this scenario, the client device implicitly trusts the digital certificate.

In response to trusting the edge node's digital certificate, the client device transmits its own digital certificate to the edge node. The edge node performs the same process to confirm the client device's digital certificate.

In step 304a, the client device and edge node exchange session keys and establish a secure communications channel. In one embodiment, the client device sends one more random string of bytes (e.g., a "premaster secret"). In one embodiment, the random string of bytes may be encrypted with the public key of the edge node and may only be decrypted with the private key held by the edge node. In this scenario, the client device obtains the public key from the verified digital certificate of the edge node. The edge node decrypts the premaster secret, and both the edge node and client device generate from the premaster secret and random values exchanged between the devices. The session keys generated by the client and server independently should be identical. The devices then exchange an encrypted finished message, verifying that the keys are identical and the messages can be decrypted.

In step 306a, the method includes generating one or more homomorphic keys on the client device. In one embodiment, the method uses a cryptographic algorithm that can generate a secret key for use with an HE algorithm. The specific algorithm implemented may depend on the HE algorithm used and is thus not limiting. In general, however, the method generates a fixed-length value that is randomly or pseudo-randomly generated based on a supplied context. The supplied context may include a plurality of parameters used to seed the key generation algorithm. In one embodiment, the method may generate a single key. In this embodiment, the single key comprises a symmetric key. In other embodiments, the method may generate multiple keys. In these embodiments, the method may generate a public and private key and thus may comprise an asymmetric key pair.

In step 308a, the method requests the provisioning of one or more generated homomorphic keys.

In one embodiment, the method includes the generated keys in a network request and calls an endpoint of the edge node over the secure channel to transmit the keys to the edge node. For example, the method may issue an HTTPS POST request to the URL https://edgenode/keys/provision and include the generated keys in the POST body.

Figure 3B:
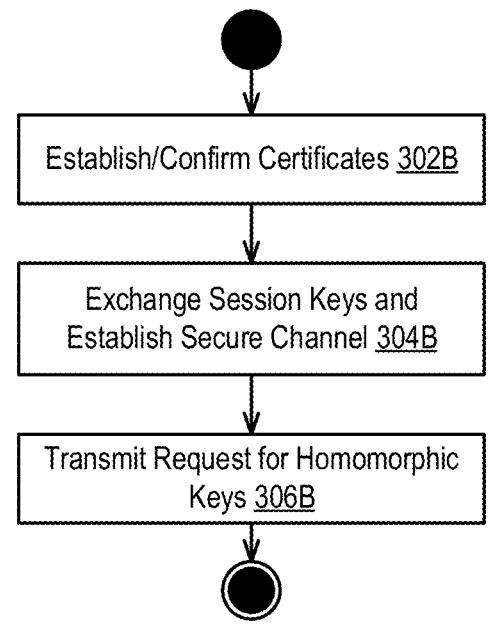
Figure 3C:
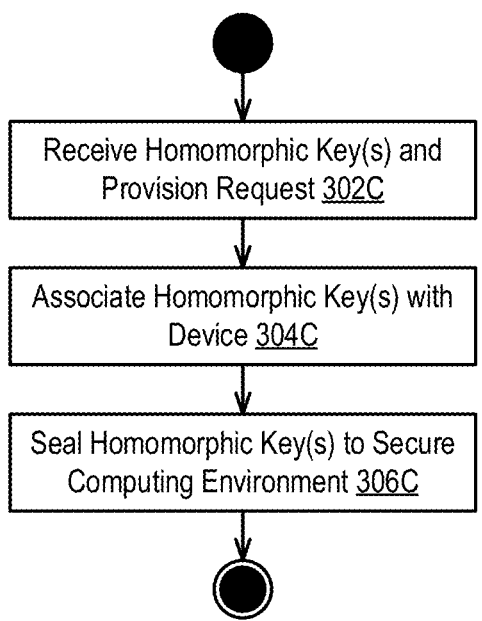

In the illustrated embodiment, the edge node may, in response to step 308a, execute the method in FIG. 3C.

FIG. 3B illustrates a second embodiment executed by a client device to establish one or more homomorphic keys. In contrast to FIG. 3A, the method in FIG. 3B requires less computation by the client device by eliminating the local key generation.

In step 302b, the method includes establishing and confirming digital certificates before establishing a secure channel. In one embodiment, the secure channel comprises a TLS/SSL channel. In one embodiment, a client device transmits an initiation message to an edge node (e.g., a TLS HELLO message) that identifies available cryptographic operations (e.g., cipher suites). In response, the edge node returns a selected cipher suite (i.e., one supported by the edge node as well) and a digital certificate. In one embodiment, the digital certificate of the edge node may be a self-signed certificate. In other embodiments, the digital certificate may comprise a certificate signed by a CA.

The client device confirms the digital certificate is valid. In one embodiment, the client device first checks to ensure that the edge node's certificate is not expired and that the domain name or IP address on the certificate matches the edge node's IP address. Then, the client device attempts to verify that the edge node's certificate has been properly signed by the CA, who authorized it. In some embodiments, the digital certificate may self-signed. In this scenario, the client device implicitly trusts the digital certificate.

In response to trusting the edge node's digital certificate, the client device transmits its own digital certificate to the edge node. The edge node performs the same process to confirm the client device's digital certificate.

In step 304b, the client device and edge node exchange session keys and establish a secure communications channel. In one embodiment, the client device sends one more random string of bytes (e.g., a "premaster secret"). In one embodiment, the random string of bytes may be encrypted with the public key of the edge node and may only be decrypted with the private key held by the edge node. In this scenario, the client device obtains the public key from the verified digital certificate of the edge node. The edge node decrypts the premaster secret, and both the edge node and client device generate from the premaster secret and random values exchanged between the devices. The session keys generated by the client and server independently should be identical. The devices then exchange an encrypted finished message, verifying that the keys are identical and the messages can be decrypted.

In step 306B, the method includes transmitting a request for homomorphic keys to an edge node. In one embodiment, a client device issues a network request to an endpoint of an API of the edge node (e.g., an HTTPS REST API). For example, the method may include issuing a POST request to an endpoint https://edgenode/keys/generate with an empty POST body. In response, the edge node may execute the method described in FIG. 3D.

FIG. 3C illustrates a method for associating HE keys with a client device according to some embodiments.

In step 302c, the method comprises receiving homomorphic keys. In one embodiment, the homomorphic keys received in step 302c comprise the keys generated in the methods described in FIG. 3A. As discussed previously, a client device may issue a network request that includes the homomorphic keys and includes a request to provision the included keys. This request may comprise an HTTPS request to a network endpoint implementing the method of FIG. 3C.

In step 304c, the method comprises associating the received homomorphic keys with the client device that issued the request. In one embodiment, the method may further include authenticating the client device before associating the homomorphic keys with the device. In one embodiment, this authentication may comprise a username/password authentication or similar authentication (e.g., secure token authentication). In other embodiments, the authentication may comprise identifying a unique identifier of the device such as International Mobile Equipment Identity (IMEI), International mobile subscriber identity (IMSI), secure element ID (SEID), embedded identity document (EID), subscriber identity module (SIM) integrated circuit card identifier (ICCID), mobile equipment identifier (MEID), media access control (MAC) address, or other similar identifiers. In this scenario, homomorphic keys are associated with a device and not a human user. In one embodiment, the identifier may be programmatically generated based on a combination of values. For example, a calling application on the mobile device may generate its identifier based on a device identifier (e.g., IMEI) and a value known to the application. In this manner, a client device may have many identifiers.

In any scenario, in step 304c, the identifier is used to associate homomorphic keys with a device. In one embodiment, homomorphic keys are stored in a secure computing environment. In one embodiment, this secure computing environment includes a data store capable of storing identifiers and homomorphic key. For example, the secure computing environment may include a key-value store wherein the user identifier is used as the key, and the value comprises the homomorphic keys.

In step 306c, after writing the identifier and homomorphic keys to the data store, the method comprises sealing the homomorphic keys to the secure computing environment. In one embodiment, the method may seal the keys by encrypting the data store (or portion thereof). In this embodiment, the method may encrypt the data store using a master key known only to the secure computing environment. In this manner, the method may ensure that the homomorphic keys are protected from intrusion. Further, the homomorphic keys may only be accessed in the context of the secure computing environment, which holds the master key.

Figure 3D:
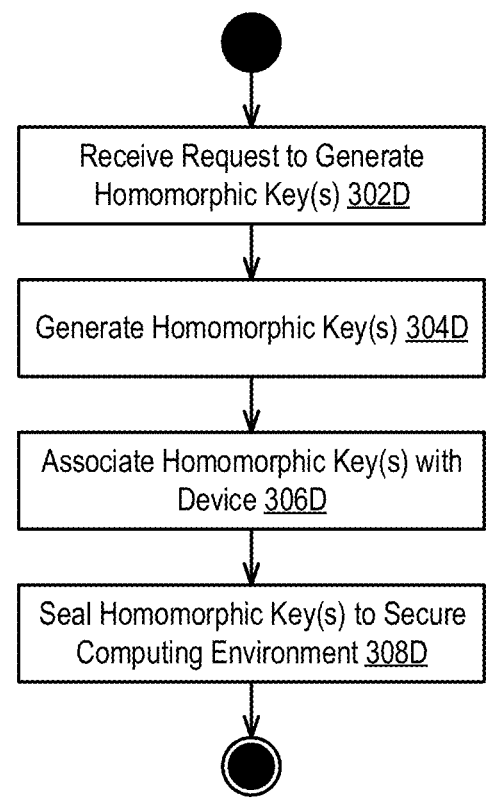

FIG. 3D illustrates a method for associating HE keys with a client device according to some embodiments.

In step 302d, the method comprises receiving a request to generate homomorphic keys. In one embodiment, a client device issues the request to an endpoint of an API (e.g., an HTTPS REST API) of an edge node implementing the methods of FIG. 3D. For example, the method may include issuing a POST request to an endpoint https://edgenode/keys/generate with an empty POST body. In some embodiments, the request received in step 302d comprises the request issued in step 306b of FIG. 3B. In one embodiment, the request further may include an identifier, discussed in more detail in step 306d.

In step 304d, the method comprises generating homomorphic keys based on the request received in step 302d. In one embodiment, the method uses a cryptographic algorithm that can generate a secret key for use with an HE algorithm. The specific algorithm implemented may depend on the HE algorithm used and is thus not limiting. In general, however, the method generates a fixed-length value that is randomly or pseudo-randomly generated based on a supplied context. The supplied context may include a plurality of parameters used to seed the key generation algorithm. In one embodiment, the method may generate a single key. In this embodiment, the single key comprises a symmetric key. In other embodiments, the method may generate multiple keys. In these embodiments, the method may generate a public and private key and thus may comprise an asymmetric key pair. In one embodiment, the context may additionally utilize the identifier received in step 302d.

In step 306d, the method comprises associating the received homomorphic keys with the client device that issued the request. In one embodiment, the method may further include authenticating the client device before associating the homomorphic keys with the device. In one embodiment, this authentication may comprise a username/password authentication or similar authentication (e.g., secure token authentication). In other embodiments, the authentication may comprise identifying a unique identifier of the device such as IMEI, IMSI, SEID, EID, SIM ICCID, MEID, MAC, or other similar identifiers. In this scenario, homomorphic keys are associated with a device and not a human user. In one embodiment, the identifier may be programmatically generated based on a combination of values. For example, a calling application on the mobile device may generate its own identifier that is based on a device identifier (e.g., IMEI) and a value known to the application. In this manner, a client device may have many identifiers.

In any scenario, in step 306d, the identifier is used to associate homomorphic keys with a device. In one embodiment, homomorphic keys are stored in a secure computing environment. In one embodiment, this secure computing environment includes a data store capable of storing identifiers and homomorphic key. For example, the secure computing environment may include a key-value store wherein the user identifier is used as the key, and the value comprises the homomorphic keys.

In step 308d, after writing the identifier and homomorphic keys to the data store, the method comprises sealing the homomorphic keys to the secure computing environment. In one embodiment, the method may seal the keys by encrypting the data store (or portion thereof). In this embodiment, the method may encrypt the data store using a master key known only to the secure computing environment. In this manner, the method may ensure that the homomorphic keys are protected from intrusion. Further, the homomorphic keys may only be accessed in the context of the secure computing environment, which holds the master key.

Figure 4A:
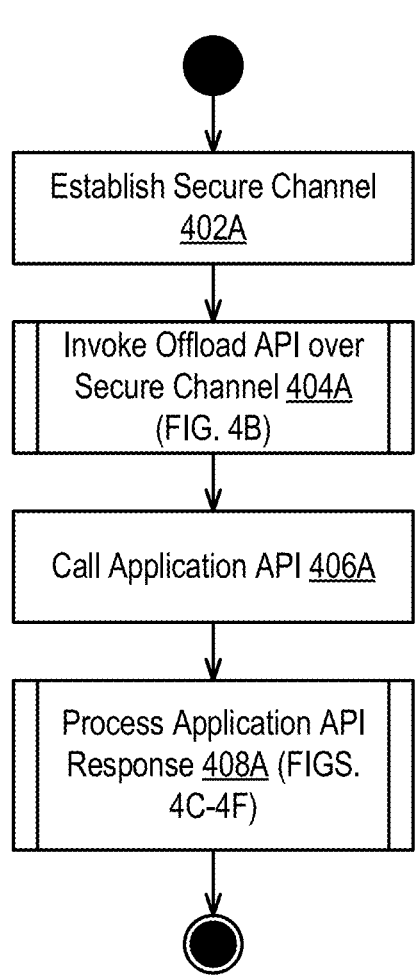
FIG. 4A is a flow diagram illustrating a method for distributing homomorphic operations according to some embodiments of the disclosure.

FIG. 4A is a flow diagram illustrating a method for distributing homomorphic operations according to some embodiments of the disclosure. In some embodiments, the methods described in connection with FIG. 4A may be performed by an edge node.

In step 402a, the method includes establishing a secure channel with a client device and receiving a request at an API over the secure channel. In the illustrated embodiment, the request includes unencrypted data.

In one embodiment, the method comprises establishing a secure channel between an edge node implementing the method and the client device using a secure transport protocol such as TLS or SSL. In one embodiment, the method includes generating a digital certificate and transmitting the digital certificate to the client device. The client device analyzes the digital certificate to verify the authenticity of the sender (i.e., the edge node) and, upon confirming the sender's identity, establishes a secure channel. In the illustrated embodiment, the secure channel comprises a TLS/SSL tunnel that encrypts data in-flight using an encryption algorithm agreed upon between the client device and edge node using a TLS or SSL handshaking procedure.

In one embodiment, the request includes unencrypted data. As discussed, this data may be encrypted during transmission via TLS/SSL. However, the method decrypts the data using its TLS/SSL private key and obtains the unencrypted data before proceeding. In the illustrated embodiment, the unencrypted data may comprise any data to send to a cloud platform for further processing. No limitation is placed on the type of data included in the API request.

The API request may comprise a network transmission to a defined endpoint, such as an HTTPS REST endpoint. Other API standards or conventions may be used, such as remote procedure call (RPC), Simple Object Access Protocol (SOAP), etc. In the illustrated embodiment, the API request is received at an edge node.

In step 404a, the method comprises invoking an offload API over the secure channel. Further detail on this step is provided in the description of FIG. 4B and is not repeated herein. However, a brief description of step 402b is provided herein.

In the illustrated embodiment, the offload API is called via a network endpoint (e.g., an HTTPS REST API). In one embodiment, the network endpoint is called by a client device that issues a network request. In one embodiment, this network request comprises an HTTPS request that includes various parameters and an application URL. In one embodiment, the various parameters include an identifier of the client device (discussed in FIGS. 3A through 3D). In one embodiment, the parameters may also include parameters specific to a cloud platform (for example, an identifier of a document to retrieve, a storage location to write data to, etc.). In one embodiment, the application URL comprises a network endpoint of a cloud platform (e.g., a cloud storage service, etc.). In most embodiments, the network request also includes application data (e.g., log data, image data, PII, etc.) to provide to the cloud platform.

In the illustrated embodiment, the method of FIG. 4A acts as an offloading intermediary that manages requests to a cloud platform for lightweight devices. Further, the method of FIG. 4A acts as an encryption-as-a-service (EaaS) platform that manages homomorphic encryption and decryption.

In brief, in step 404*a*, the method may prepare data for transmission to the cloud platform (step 404*a*), transmit the data to the cloud platform (step 406*a*), and handle the response (step 408*a*).

In one embodiment, preparing the data may comprise accessing the homomorphic keys associated with the calling client device and encrypting at least the application data in the request using an HE algorithm Next, the method comprises building a network request based on the application URL, URL parameters, and the HE data. For example, the method may build an HTTPS POST request (using a URL parameter) and the application URL. The method may add one or more POST body parameters extracted from the URL parameters (or may add such parameters as query string parameters). It may then add the encrypted application data to the POST body parameters, thus forming an HTTP request to an HTTPS endpoint (i.e., an endpoint associated with an application API).

In step 406*a*, the method comprises calling the application API. In one embodiment, the application API comprises a network endpoint, and step 406*a* may include issuing a network request to the endpoint. For example, in one embodiment, the application API comprises an HTTPS REST API, and step 406*a* comprises establishing a secure channel (e.g., using TLS/SSL) with the application API. Next, the method may call the API using the appropriate API technology (e.g., REST) and transmit the request generated in step 404*a*.

In step 408*a*, the method comprises processing the application API response. Various techniques may be used to process an API response, and examples of such techniques are described in further detail in FIGS. 4C through 4F.

In one embodiment, the application API may return a result. In this embodiment, the result comprises the encrypted ciphertext output of an HE operation performed on the encrypted data. In this embodiment, the method will decrypt the result in the secure computing environment and return the decrypted result to the client. This embodiment is described more fully in FIG. 4C.

In another embodiment, the application API may return a response URL. In this embodiment, the application API may continue performing an HE operation on the encrypted data and may immediately return a callback URL to access when the HE operation is completed. In this embodiment, the method may return the callback URL to the client device and await a request from the client to access the callback URL. Once the HE operation is complete, the callback URL can be accessed, and the ciphertext result may be obtained. As in the previous embodiment, the result comprises the encrypted ciphertext output of an HE operation performed on the encrypted data. In this embodiment, the method will decrypt the result in the secure computing environment and return the decrypted result to the client. This embodiment is described more fully in FIG. 4D.

In another embodiment, the method may establish a subscription to the application API and receive a push result from the application when the HE operation is completed. As with the preceding embodiments, the push result comprises the encrypted ciphertext output of an HE operation performed on the encrypted data. In this embodiment, the method will decrypt the push result in the secure computing environment and return the decrypted push result to the client. This embodiment is described more fully in FIG. 4E.

Finally, in another embodiment, the method may receive an immediate response from the application API, indicating that the data was successfully received. The method may then, at a later time, receive an out-of-band (OOB) request to access the result of the application API. This OOB request is authenticated to ensure the requestor may access the result. Specifically, the OOB request may be issued by the client device or a third-party device and thus may be requested by devices other than the device that issued the request in steps 402*a* and 404*a*. If the requestor issuing the OOB is authorized, the method will retrieve the encrypted ciphertext result from the cloud platform and decrypt the result in the secure computing environment and return the decrypted result to the requestor. This embodiment is described more fully in FIG. 4F.

In some embodiments, the foregoing method may be transparent to the client device. That is, the client device may address API calls to the ultimate cloud provider or application. An edge node handling communications for the client device can identify these requests and perform the method of FIG. 4A for any identifiable request. In this manner, the client device is unaware that data is being secured by an edge node before issuing, and after receiving, requests to a cloud provider.

Figure 4B:
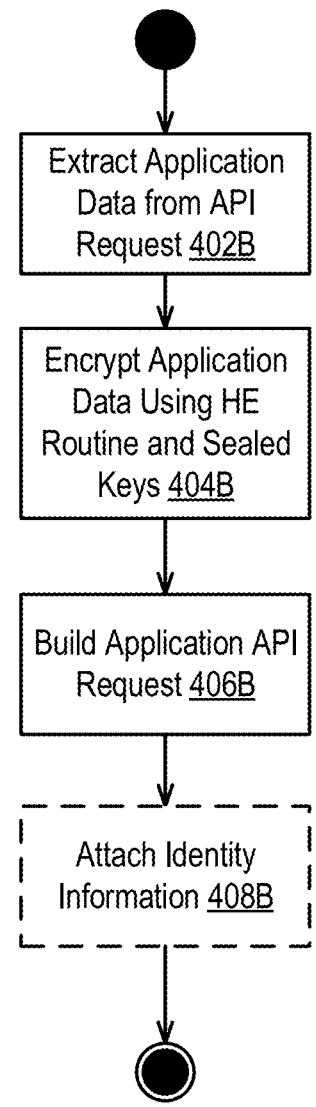
FIG. 4B is a flow diagram illustrating a method for generating a request for performing homomorphic operations based on an unencrypted client request according to some embodiments of the disclosure.

FIG. 4B is a flow diagram illustrating a method for generating a request for performing homomorphic operations based on an unencrypted client request according to some embodiments of the disclosure. In some embodiments, the methods described in connection with FIG. 4B may be performed by an edge node.

In step 402*b*, the method comprises extracting application data from an API request. In one embodiment, the API request may comprise a network request issued by a client device to an edge node. In one embodiment, the API request may comprise an HTTPS request such as an HTTPS POST message. In one embodiment, extracting the application comprises reading cleartext application data from a body of the POST message or from a query string parameter. The type of application is not limiting and may comprise any data generated by the client device such as sensor readings, health data, PII data, etc.

In step 404*b*, the method comprises encrypting the application data using an HE algorithm and one or more sealed keys.

In one embodiment, the method extracts an identifier from the API request. Various types of identifiers have been described previously and are not repeated herein. In general, the identifier comprises a unique value that identifies either the device issuing the API request or a user of the device issuing the API request. Next, the method may use the identifier to query a key-value store of homomorphic keys. In one embodiment, this key-value store is located in a secure computing environment. In one embodiment, the querying of the key-value store returns one or more homomorphic keys associated with the identifier. Next, the method uses the returned keys to encrypt the application data. In one embodiment, the encryption may be performed in the secure computing environment, thus ensuring that the homomorphic keys are not exposed outside the secure computing environment. In the illustrated embodiment, the specific HE algorithm and key type and size are not limiting, and any HE algorithm may be used.

In step 406*b*, the method comprises building an application API request. In one embodiment, building the request may comprise populating parameters of an application URL based on the API request. In one embodiment, the API request may include the application URL. For example, the network request may include an endpoint parameter that includes a fully formed URL of a cloud platform API endpoint (e.g., https://api.cloudservice.com/endpoint). The API request may further include various parameters required to access the cloud platform. For example, an HTTPS POST body may include a plurality of key-value pairs, including keys and values, to submit to the endpoint. In another embodiment, the API request may include a payload that includes additional detail regarding the application URL parameters. For example, a Javascript Object Notation (JSON) object may, for each parameter, list the parameter name, the value, and a method for including (query string, POST body, etc.). Thus, in step 404*b*, the method generates a network request using the URL and relevant parameters. Finally, the method may add the encrypted application data to the network request, finalizing the request body.

In some embodiments, the method may implement an additional step 408*b*. In step 408*b*, the method attaches identity information to the application API request. In this embodiment, the edge node implementing the method may operate as an identity provider for the client device. Specifically, before executing the method, the client device may seed the edge node with various identities for one or more applications (e.g., usernames, passwords, tokens, etc.). In response, the edge node stores these identities in a secure computing environment. As discussed, if multiple edge nodes are implemented, these multiple edge nodes may synchronize the identity data (optionally via a central server). When the client device issues the API request, the method in FIG. 4B can identify the requested application and retrieve the application identity details from the secure computing environment. Then, the method can populate the application API request with the identity data for the specific application. In this manner, the client device does not need to maintain credentials for each cloud-based application. Instead, it can store these credentials in the edge node and, more specifically, in the secure computing environment. Thus, from the perspective of the client device, the client device can issue unauthenticated requests to a cloud provider via the edge node, whereby the edge node augments the request with the appropriate credentials.

FIGS. 4C through 4F are flow diagrams illustrating methods processing the results of a distributed homomorphic operation according to some embodiments of the disclosure. In some embodiments, the methods described in connection with FIGS. 4C through 4F may be performed by an edge node.

FIG. 4C is a flow diagram illustrating a method for synchronously processing the result of a homomorphic operation according to some embodiments of the disclosure.

In step 402*c*, the method comprises receiving encrypted response data. In one embodiment, an edge node receives the encrypted response data from a cloud platform or application. In one embodiment, the cloud platform or application corresponds to the application API called in step 406*a* of FIG. 4A.

In one embodiment, a cloud provider is configured to operate on homomorphically encrypted data. Thus, in some embodiments, the cloud provider includes separate hardware and/or software for performing HE operations on encrypted data. The output of these HE operations comprises an encrypted result. The encrypted result from the HE operations is provided, in step 402*c*, as the response data for an API call. In some embodiments, the API call comprises a network request (e.g., issuing an HTTPS request to a REST API), and the response data comprises a network response (e.g., an HTTPS response). In some embodiments, the response data is included in the body of the response or in a header of the response. For example, the response data may be included in an HTTPS response body or a header field. In some embodiments, the choice of location may be selected based on the size of the response data and, if too large for a header, may be included in the HTTPS response body. In some embodiments, the response data may be streamed to the client, and thus the response data may be transmitted in chunks to the calling device (i.e., edge node).

In step 404*c*, the method comprises decrypting the response data in a secure computing environment. In one embodiment, the method comprises extracting the encrypted response data from the API response (e.g., HTTPS response) and transmitting the response to the secure computing environment. In some embodiments, the method comprises maintaining a session data store to associate a network response with the application API request, thus ensuring that an identifier of the client device can be associated with the response data. In some embodiments, the cloud provider may return the identifier, allowing the endpoint to be stateless. In one embodiment, the method comprises transmitting the identifier to the secure computing environment along with the encrypted response data. In response, the secure computing environment identifies one or more homomorphic keys associated with the response data (via the identifier) and decrypts the response data using the key. Details of accessing keys based on identifiers are provided in the description of step 404*b* of FIG. 4B and are not repeated herein. In general, any homomorphic decryption algorithm may be used, provided it corresponds to the HE algorithm used in step 404*b* of FIG. 4B.

In step 406*c*, the method comprises returning the decrypted data via the secure channel. In the illustrated embodiment, the secure channel corresponds to the secure channel established in step 402*a* of FIG. 4A. In the illustrated embodiment, the method comprises receiving the decrypted data from the secure computing environment and packaging the decrypted data into a network response (e.g., an HTTPS response). The method then comprises transmitting this network response, including the decrypted data, to the client in response to the request received in step 404*a*.

As illustrated in the foregoing description, the method of FIG. 4C provides synchronous response data to a calling client while simultaneously protecting application data from a cloud provider. That is, a client issues a request with unencrypted and awaits a result with unencrypted response data. However, in some embodiments, HE algorithms may require significantly longer processing times than non-encrypted network interactions. Thus, in some embodiments, a deferred response mechanism is required to ensure low-latency responses.

FIG. 4D is a flow diagram illustrating a method for asynchronously processing the result of a homomorphic operation according to some embodiments of the disclosure.

In step 402*d*, the method comprises receiving a response URL and one or more parameters from a cloud provider or application. In one embodiment, the response URL comprises an endpoint of the cloud provider or application where the results of HE operations will be available when complete. The one or more parameters may include an estimated time to completion, a check interval, or other data indicating when a follow-up network request should be issued. In some embodiments, the cloud provider or application may return the response URL and parameters as soon as the cloud provider or application confirms that the API request is processible. Thus, the cloud provider or application may confirm any credentials, parse the request body, and immediately return the response with the response URL. Thus, in contrast to FIG. 4C, the method does not receive the results of the HE operations but rather a location where the results eventually will be available.

In step 404d, the method comprises forwarding the response URL and parameters to the client. In one embodiment, the method comprises bypassing any type of secure computing environment processing in step 404d and forwarding the response that the cloud provider or application provided directly to the client device. In this manner, the client device can receive the response from the cloud provider or application as quickly possible.

In step 406d, the method comprises receiving a request to access the response URL. In one embodiment, the method comprises receiving a second network request to access the offload API from the client device. In step 406d, however, the second network request includes the response URL received in step 402d. Thus, the method may comprise bypassing any secure computing environment operations and calling the response URL (with any parameters). In an alternative embodiment, the method may comprise intercepting a call from the client device directly to the cloud provider or application. In this manner, an edge node operating the method may act as a proxy to the cloud platform.

In step 408d, the method comprises accessing the response URL. In some embodiments, the method comprises issuing a network request to the application API via the response URL. In some embodiments, this network request may comprise an HTTPS request to an API such as a REST API. As part of step 408d, the method may comprise adding any necessary parameters to complete the request. In one embodiment, the method may further comprise determining if enough time has elapsed before issuing the request to the response URL. In these embodiments, the method may use the parameters returned in step 402d to determine if the response is or should be ready.

In step 410d, the method comprises receiving encrypted response data. In one embodiment, an edge node receives the encrypted response data from a cloud platform or application. In one embodiment, the cloud platform or application corresponds to the application API called in step 406a of FIG. 4A.

In one embodiment, a cloud provider is configured to operate on homomorphically encrypted data. Thus, in some embodiments, the cloud provider includes separate hardware and/or software for performing HE operations on encrypted data. The output of these HE operations comprises an encrypted result. The encrypted result from the HE operations is provided, in step 402c, as the response data for an API call. In some embodiments, the API call comprises a network request (e.g., issuing an HTTPS request to a REST API), and the response data comprises a network response (e.g., an HTTPS response). In some embodiments, the response data is included in the body of the response or in a header of the response. For example, the response data may be included in an HTTPS response body or in a header field. In some embodiments, the choice of location may be selected based on the size of the response data and, if too large for a header, may be included in the HTTPS response body. In some embodiments, the response data may be streamed to the client, and thus the response data may be transmitted in chunks to the calling device (i.e., edge node).

In step 412d, the method comprises decrypting the response data in a secure computing environment. In one embodiment, the method comprises extracting the encrypted response data from the API response (e.g., HTTPS response) and transmitting the response to the secure computing environment. In some embodiments, the method comprises maintaining a session data store to associate a network response with the application API request, thus ensuring that an identifier of the client device can be associated with the response data. In some embodiments, the cloud provider may return the identifier, allowing the endpoint to be stateless. In one embodiment, the method comprises transmitting the identifier to the secure computing environment along with the encrypted response data. In response, the secure computing environment identifies one or more homomorphic keys associated with the response data (via the identifier) and decrypts the response data using the key. Details of accessing keys based on identifiers are provided in the description of step 404b of FIG. 4B and are not repeated herein. In general, any homomorphic decryption algorithm may be used, provided it corresponds to the HE algorithm used in step 404b of FIG. 4B.

In step 414d, the method comprises returning the decrypted data via the secure channel. In the illustrated embodiment, the secure channel corresponds to the secure channel established in step 402a of FIG. 4A. In the illustrated embodiment, the method comprises receiving the decrypted data from the secure computing environment and packaging the decrypted data into a network response (e.g., an HTTPS response). The method then comprises transmitting this network response, including the decrypted data, to the client in response to the request received in step 404a.

As illustrated in the foregoing description, the method of FIG. 4D provides asynchronous response data to a calling client while simultaneously protecting application data from a cloud provider. That is, a client issues a request with unencrypted and immediately receives a location where results will eventually be ready for access. An edge node then intercepts or handles access to this location to provide HE decryption on the result and ultimately provide the decrypted result to the client.

FIG. 4E is a flow diagram illustrating a method for subscribing to a homomorphic operation according to some embodiments of the disclosure.

In step 402e, the method comprises initiating a subscription. In some embodiments, initiating the subscription may comprise initiating a streaming channel with the cloud provider, with the client device, or both. As one example, an HTTP/2 server push mechanism may be employed to push content to a sender of an HTTPS request, enabling subscriptions. In other embodiments, PubSub or other messaging systems may be used. In some embodiments, various and differing techniques may be used. For example, HTTP/2 techniques may be used between the client device and the edge node, while a message queue (MQ) may be used between the edge node and the cloud platform.

In step 404e, the method comprises monitoring the application API status. In one embodiment, a subscription is set up between an edge node and the cloud platform. The method monitors to determine if any data is pushed from the cloud platform to the edge node.

In step 406e, the method comprises determining if any data was received. If no data is pushed over the subscription, the method comprises continuing to await data. In some embodiments, the method may employ a timeout to terminate the subscription if no data is received after a preconfigured length of time.

Conversely, if the method determines that data was transmitted over the subscription, it proceeds to step 408e. In some embodiments, the data detected may comprise a complete encrypted result. In these embodiments, the method proceeds directly to step 408e. Alternatively, in some embodiments, the method may receive chunks of the encrypted result. In these embodiments, the method buffers the data until the end of the decrypted data is signaled and then proceeds to step 408e.

In step 408e, the method comprises decrypting the data in a secure computing environment and returning it to the client. In one embodiment, the method comprises extracting the encrypted response data from the API response (e.g., HTTPS response) and transmitting the response to the secure computing environment. In some embodiments, the method comprises maintaining a session data store to associate a network response with the application API request, thus ensuring that an identifier of the client device can be associated with the response data. In some embodiments, the cloud provider may return the identifier, allowing the endpoint to be stateless. In one embodiment, the method comprises transmitting the identifier to the secure computing environment along with the encrypted response data. In response, the secure computing environment identifies one or more homomorphic keys associated with the response data (via the identifier) and decrypts the response data using the key. Details of accessing keys based on identifiers are provided in the description of step 404b of FIG. 4B and are not repeated herein. In general, any homomorphic decryption algorithm may be used, provided it corresponds to the HE algorithm used in step 404b of FIG. 4B. The method further comprises returning the decrypted data via the secure channel. In the illustrated embodiment, the secure channel corresponds to the secure channel established in step 402a of FIG. 4A. In the illustrated embodiment, the method comprises receiving the decrypted data from the secure computing environment and packaging the decrypted data into a network response (e.g., an HTTPS response). The method then comprises transmitting this network response, including the decrypted data, to the client in response to the request received in step 404a.

In some embodiments, the method may only subscribe to a single result. In these scenarios, the method may end after step 408e. However, in some embodiments, the method may subscribe to multiple results. In this scenario, the method may comprise determining whether all results have been received in step 410e. If the method determines that more results are pending, the method re-executes steps 404e, 406e, 408e, and 410e for each remaining result.

FIG. 4F is a flow diagram illustrating a method for receiving out-of-band results of a homomorphic operation according to some embodiments of the disclosure. As used herein, out-of-band results refer to responses regarding the status of a network processing request that are provided to either a third-party computing device that did not initiate the request or outside of the session wherein the request was generated.

In step 402f, the method returns a response code to a client device and ends the transaction. In some embodiments, the method executes step 402f after receiving a response from the cloud platform API. Returning to FIG. 4A, the method in that description establishes a secure channel (step 402a) with a client and issues an external network request (step 406a). When receiving a response to that network request, the method of FIG. 4F returns a response code (e.g., an HTTPS response code) and terminates the secure channel, thus ending the transaction.

In step 404f, the method comprises receiving a request for data. In one embodiment, the request comprises an HTTPS request for the data processed by the cloud platform. In one embodiment, the request may be issued by the same client device that initially requested the data. However, in other embodiments, no limitation is placed on the device that issues the request received in step 404f. Specifically, a third-party computing device may issue such a request. As one example, the client device which receives the response code in step 402f may comprise an IoT sensor, whereas the device that issues the request in step 404f may comprise a smart appliance (e.g., in the same building or room).

Since the identity of the device requesting the result data is not known, the method comprises authenticating the requestor in step 406f. In one embodiment, the requestor provides credentials to access data from the cloud platform. In the illustrated embodiment, the method determines whether the credentials authorize the device to access the result. In one embodiment, a database of accounts and devices associated with those accounts is maintained to determine whether two devices are both authorized to access the same data on a cloud platform. If the requestor is not authorized, the method ends.

In step 408f, the method comprises decrypting the data in a secure computing environment and returning the data to the requestor if the requestor is authorized. In one embodiment, the method comprises extracting the encrypted response data from the API response (e.g., HTTPS response) and transmitting the response to the secure computing environment. In some embodiments, the method comprises maintaining a session data store to associate a network response with the application API request, thus ensuring that an identifier of the client device can be associated with the response data. In some embodiments, the cloud provider may return the identifier, allowing the endpoint to be stateless. In one embodiment, the method comprises transmitting the identifier to the secure computing environment along with the encrypted response data. In response, the secure computing environment identifies one or more homomorphic keys associated with the response data (via the identifier) and decrypts the response data using the key. Details of accessing keys based on identifiers are provided in the description of step 404b of FIG. 4B and are not repeated herein. In general, any homomorphic decryption algorithm may be used, provided it corresponds to the HE algorithm used in step 404b of FIG. 4B. The method further comprises returning the decrypted data to the requestor via an OOB channel (i.e., a separate TLS/SSL channel). In the illustrated embodiment, the method comprises receiving the decrypted data from the secure computing environment and packaging the decrypted data into a network response (e.g., an HTTPS response). The method then comprises transmitting this network response, including the decrypted data, to the requestor in response to the request received in step 404a.

Figure 5:
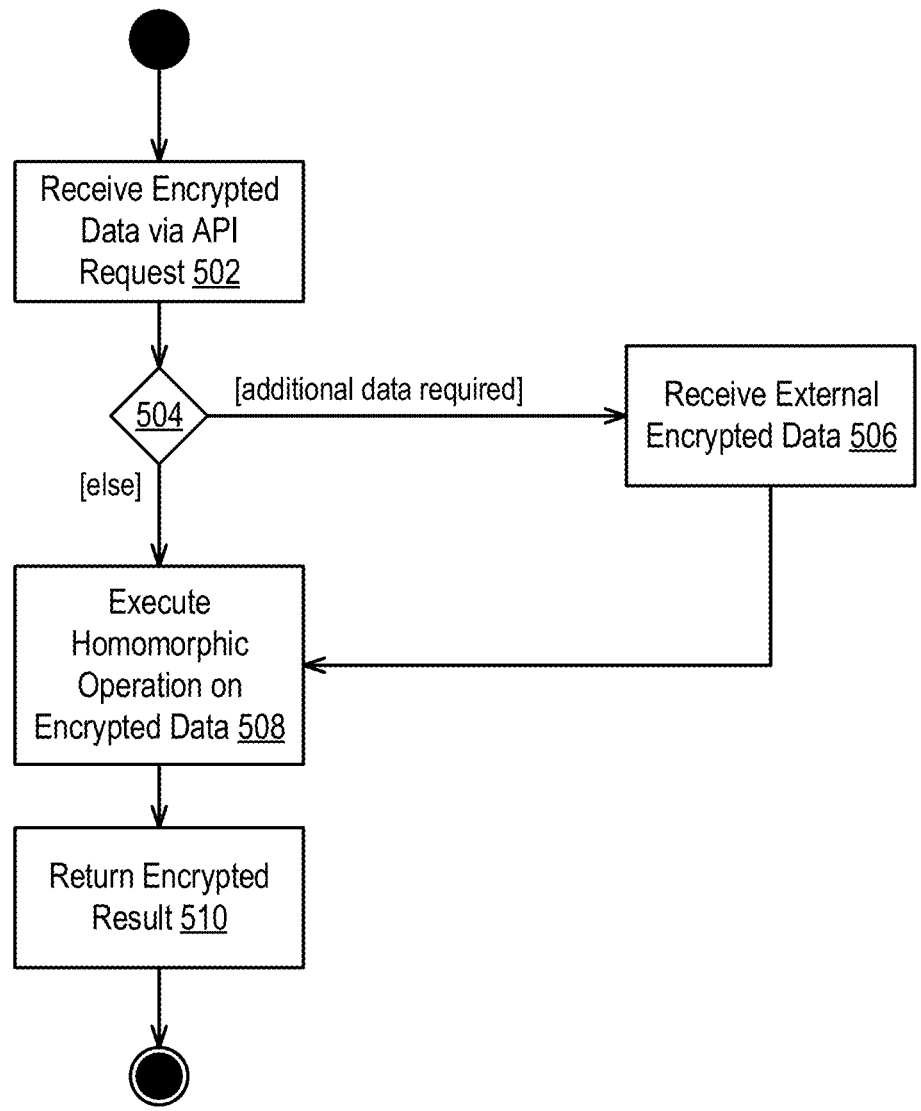
FIG. 5 is a flow diagram illustrating a method for performing a homomorphic operation according to some embodiments of the disclosure.

FIG. 5 is a flow diagram illustrating a method for performing a homomorphic operation according to some embodiments of the disclosure. In some embodiments, the methods described in connection with FIG. 5 may be performed by a cloud platform. Alternatively, as discussed above, in some embodiments, the methods described in connection with FIG. 5 may be performed by an edge node.

In step 502, the method comprises receiving encrypted data. In one embodiment, the method operates a network endpoint for receiving API requests. In one embodiment, these API requests comprise HTTPS requests, and the endpoint comprises an HTTPS REST API. However, other types of APIs may be used, and other network transports (e.g., PubSub, message queues, etc.) may be used. In one embodiment, the API request additionally includes data sufficient to identify a processing routine to execute. For example, the API request may include an endpoint, a function name, etc. The API request may also include parameters used to control the processing routine. Finally, the API request includes homomorphically encrypted data used in the processing routine. This data may be encrypted as described in the description of FIG. 4B.

In step 504, the method comprises determining if additional data is required. In some embodiments, the processing routine invoked by the method may require additional data from other devices. For example, the processing routine may require data from multiple sensors before continuing to generate a single log file entry representing the data.

If the method determines that additional data is needed, the method awaits and receives additional external encrypted data in step 506. In the illustrated embodiment, the encrypted data also comprises encrypted homomorphic data. In some embodiments, this data is encrypted using the same key; however, this is not required.

In step 508, the method comprises executing a homomorphic operation on the data. As discussed, the method in FIG. 5 does not decrypt any encrypted application data before executing the homomorphic operation and thus operates on the encrypted data.

In one embodiment, the homomorphic operation may comprise an operation in a partially homomorphic encryption (PHE) system. In this embodiment, a subset of all possible mathematical functions may be performed on encrypted data. In this embodiment, one operation can be performed an unlimited number of times on the encrypted data.

In another embodiment, the homomorphic operation may comprise an operation in a somewhat homomorphic encryption (SHE) system. In this embodiment, limited operations (e.g., either addition or multiplication) may be performed on the encrypted data up to a certain complexity, but these operations can only be performed a set number of times.

In another embodiment, the homomorphic operation may comprise an operation in a fully homomorphic encryption (FHE) system. In this embodiment, any efficiently computable functions may be performed any number of times on the encrypted data. Thus, any arbitrary computations may be performed on the encrypted data.

In step 510, the method comprises returning the results of the homomorphic operation to the calling party. As discussed above, the calling party may comprise an edge node. In the illustrated embodiment, the result may be returned via a network response such as an HTTPS response. In one embodiment, a secure channel (e.g., TLS/SSL) is established in step 502, and the result is transmitted using this secure channel before closing the channel.

To further expand upon the foregoing embodiments, various use cases are described below. The following use cases are some, not all, of the use cases of the generalized system described above.

In a first example, a plurality of IoT sensors is deployed within the range of a cellular base station, which acts as an edge node. These IoT sensors record sensitive data that may then be processed by a cloud platform. In some embodiments, the IoT sensors are operated by various entities, and thus data cannot be shared between them. In this example, data from the IoT sensors is transmitted over a secure channel to the base station and homomorphically encrypted therein in a secure computing environment. Then, the encrypted data is sent to a cloud platform. The cloud platform may perform arbitrary processing and/or aggregation operations on the sensor data without access to the underlying raw data. Specific implementations may implement track and trace operations of in transportation networks and supply chains or may be used to process agricultural data to derive commodity futures values.

In a second example, mobile devices (i.e., client devices) may be equipped with mobile applications that allow for real-time bidding on auctions. These bids may be transmitted to a cellular base station (i.e., edge node) wherein the bid data is homomorphically encrypted before being forwarded to an auction server. The auction server can then process the bids anonymously without any knowledge of the underlying mobile device or user thereof. Further, multiple parties can participate anonymously.

In a third example, health data may be recorded by a wearable device (i.e., client device). This health data may be transmitted to an edge node for homomorphic encryption before being sent to a cloud platform. Since the cloud platform does not have access to raw health data (thus complying with privacy regulations) but can still perform analysis of the data to support health condition prediction, remedy recommendations, and other operations.

Figure 6:
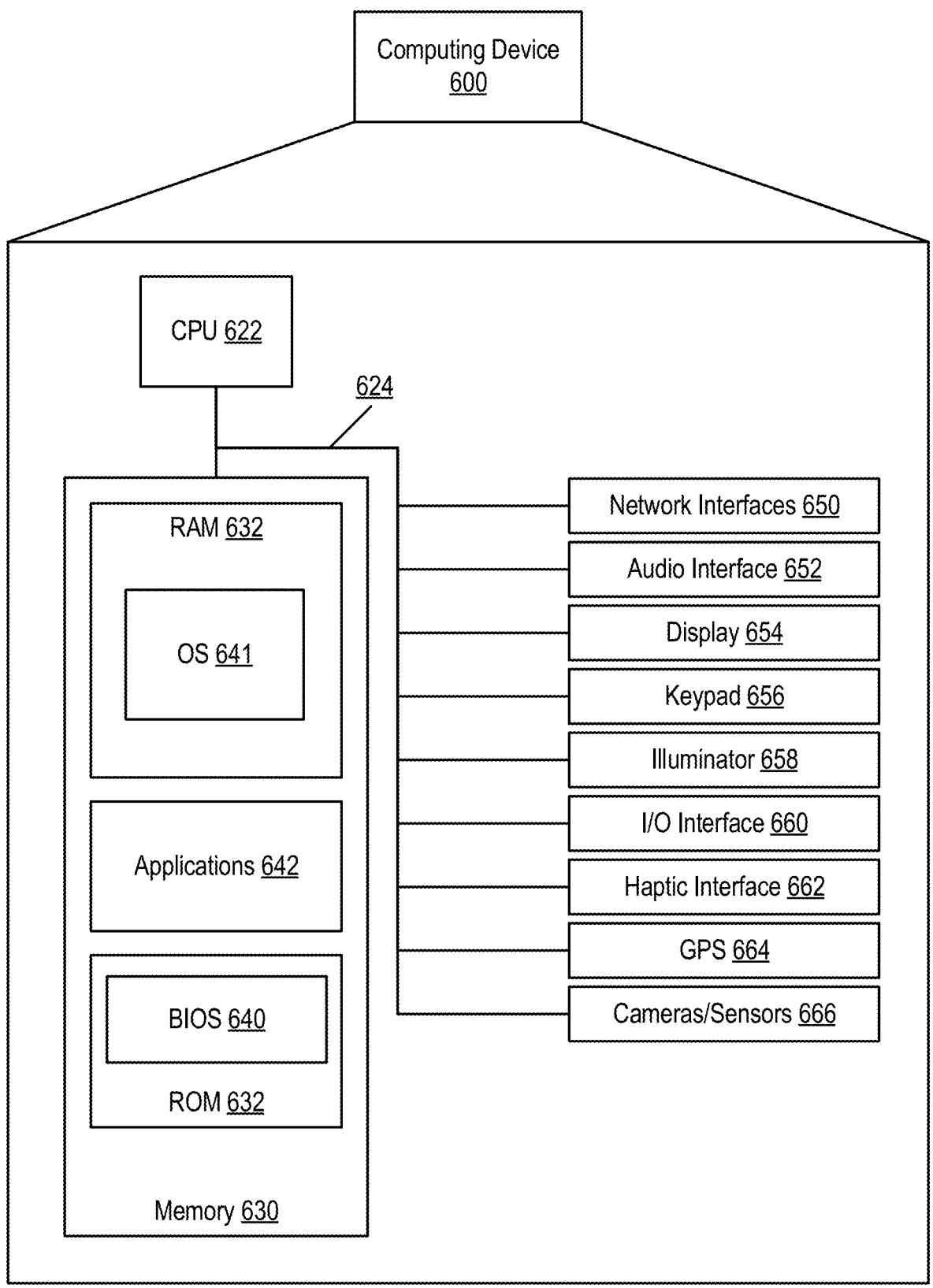
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device (600) may include more or fewer components than those shown in FIG. 6, depending on the deployment or usage of the device (600). For example, a server computing device, such as a rack-mounted server, may not include audio interfaces (652), displays (654), keypads (656), illuminators (658), haptic interfaces (662), Global Positioning Service (GPS) receivers (662), or cameras/sensors (666). Some devices may include additional components not shown, such as graphics processing unit (GPU) devices, cryptographic co-processors, artificial intelligence (AI) accelerators, or other peripheral devices.

As shown in the figure, the device (600) includes a central processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666). The positioning of the camera(s)/sensor(s) (666) on the device (600) can change per device (600) model, per device (600) capabilities, and the like, or some combination thereof.

In some embodiments, the CPU (622) may comprise a general-purpose CPU. The CPU (622) may comprise a single-core or multiple-core CPU. The CPU (622) may comprise a system-on-a-chip (SoC) or a similar embedded system. In some embodiments, a GPU may be used in place of, or in combination with, a CPU (622). Mass memory (630) may comprise a dynamic random-access memory (DRAM) device, a static random-access memory device (SRAM), or a Flash (e.g., NAND Flash) memory device. In some embodiments, mass memory (630) may comprise a combination of such memory types. In one embodiment, the bus (624) may comprise a Peripheral Component Interconnect Express (PCIe) bus. In some embodiments, the bus (624) may comprise multiple busses instead of a single bus.

Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The computing device (600) may optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth™, or the like. The haptic interface (662) provides tactile feedback to a user of the client device.

The optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may communicate through other components, provide other information that may be employed to determine a physical location of the device, including, for example, a MAC address, IP address, or the like.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
    receiving, at an edge node of a cellular network, an unencrypted data from a client device;
    retrieving, by the edge node, a homomorphic encryption (HE) key associated with the client device, the HE key synchronized with at least one other edge node in the cellular network;
    encrypting, by the edge node, the unencrypted data using the HE key to generate encrypted data;
    transmitting, by the edge node, the encrypted data to a cloud platform;
    transmitting, by the edge node, a response URL to the client device, the response URL received from the cloud platform;
    retrieving, by the edge node, encrypted response data from the response URL in response to a request from the client device, the encrypted response data comprising an output of a homomorphic operation performed on the encrypted data by the cloud platform without decrypting the encrypted data;
    decrypting, by the edge node, the encrypted response data; and
    returning, by the edge node, the decrypted data to the client device.

2. The method of claim 1, wherein encrypting the unencrypted data comprises executing an HE algorithm in a secure computing environment.

3. The method of claim 2, wherein encrypting the unencrypted data using the HE algorithm comprises retrieving the HE key from the secure computing environment.

4. The method of claim 1, wherein transmitting the encrypted data to the cloud platform comprises initiating a subscription with the cloud platform and wherein responsive data from the cloud platform comprises receiving a notification via the subscription.

5. The method of claim 1, wherein retrieving encrypted responsive data further comprises:
    receiving a response code and using the response code as a return value;
    receiving an out-of-band request for the responsive data from a computing device; and
    confirming that the computing device is authorized to receive the responsive data.

6. The method of claim 1, further comprising:
    receiving, by the edge node, one or more HE keys from the client device before receiving the unencrypted data; and
    sealing, by the edge node, the one or more HE keys in a secure computing environment.

7. The method of claim 1, further comprising:
    receiving, by the edge node, a request to provision an HE key from the client device before receiving the unencrypted data; and
    generating, by the edge node, the HE key in response to the request.

8. A non-transitory computer-readable storage medium for tangibly storing computer program instructions capable of being executed by a computer processor of an edge node in a cellular network, the computer program instructions defining steps of:
    receiving an unencrypted data from a client device;

retrieving a homomorphic encryption (HE) key associated with the client device, the HE key synchronized with at least one other edge node in the cellular network;

encrypting the unencrypted data using the HE key to generate encrypted data; and transmitting the encrypted data to a cloud platform;

transmitting a response URL to the client device, the response URL received from the cloud platform;

retrieving encrypted response data from the response URL in response to a request from the client device, the encrypted response data comprising an output of a homomorphic operation performed on the encrypted data by the cloud platform without decrypting the encrypted data;

decrypting the encrypted response data; and returning the decrypted data to the client device.

9. The non-transitory computer-readable storage medium of claim 8, wherein encrypting the unencrypted data comprises executing an HE algorithm in a secure computing environment.

10. The non-transitory computer-readable storage medium of claim 9, wherein encrypting the unencrypted data using the HE algorithm comprises retrieving the HE key from the secure computing environment.

11. The non-transitory computer-readable storage medium of claim 8, the step further comprising:

receiving one or more HE keys from the client device before receiving the unencrypted data; and sealing the one or more HE keys in a secure computing environment.

12. The non-transitory computer-readable storage medium of claim 8, the steps further comprising:

receiving a request to provision an HE key from the client device before receiving the unencrypted data; and generating the HE key in response to the request.

13. A device comprising:

a processor configured to execute program logic at an edge node of a cellular network, the program logic comprising:

logic, executed by the processor, for receiving an unencrypted data from a client device, logic, executed by the processor, for retrieving a homomorphic encryption (HE) key associated with the client device, the HE key synchronized with at least one other edge node in the cellular network, logic, executed by the processor, for encrypting the unencrypted data using the HE key to generate encrypted data, logic, executed by the processor, for transmitting the encrypted data to a cloud platform, logic, executed by the processor, for transmitting a response URL to the client device, the response URL received from the cloud platform, logic, executed by the processor, for retrieving encrypted response data from the response URL in response to a request from the client device, the encrypted response data comprising an output of a homomorphic operation performed on the encrypted data by the cloud platform without decrypting the encrypted data, logic, executed by the processor, for decrypting the encrypted response data, and logic, executed by the processor, for returning the decrypted data to the client device.

14. The device of claim 13, wherein encrypting the unencrypted data comprises executing an HE algorithm in a secure computing environment.

15. The device of claim 13, the program logic further comprising:

logic, executed by the processor, for receiving one or more HE keys from the client device before receiving the unencrypted data; and logic, executed by the processor, for sealing the one or more HE keys in a secure computing environment.

16. The device of claim 13, the program logic further comprising:

logic, executed by the processor, for receiving a request to provision an HE key from the client device before receiving the unencrypted data; and logic, executed by the processor, for generating the HE key in response to the request.

17. The method of claim 1, wherein the edge node performs the encrypting of the unencrypted data via an offload API exposed to client devices.

18. The method of claim 1, wherein the edge node is part of an encryption as a service platform managing encryption and decryption.

19. The non-transitory computer-readable storage medium of claim 8, wherein the edge node performs the encrypting of the unencrypted data via an offload API exposed to client devices.

20. The device of claim 13, wherein the edge node performs the encrypting of the unencrypted data via an offload API exposed to client devices.

* * * * *